United States Patent
Znamenskiy et al.

(10) Patent No.: US 9,363,436 B2
(45) Date of Patent: Jun. 7, 2016

(54) CAMERA SYSTEM COMPRISING A CAMERA, CAMERA, METHOD OF OPERATING A CAMERA AND METHOD FOR DECONVOLUTING A RECORDED IMAGE

(75) Inventors: Dmitry Nikolayevich Znamenskiy, Eindhoven (NL); Ruben Rajagopalan, Eindhoven (NL); Rifat Ata Mustafa Hikmet, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 0 days.

(21) Appl. No.: 14/006,146

(22) PCT Filed: Mar. 13, 2012

(86) PCT No.: PCT/IB2012/051181
§ 371 (c)(1),
(2), (4) Date: Sep. 19, 2013

(87) PCT Pub. No.: WO2012/127362
PCT Pub. Date: Sep. 27, 2012

(65) Prior Publication Data
US 2014/0009670 A1   Jan. 9, 2014

(30) Foreign Application Priority Data
Mar. 22, 2011   (EP) .................................... 11159146

(51) Int. Cl.
*H04N 5/225* (2006.01)
*G02B 13/16* (2006.01)
(Continued)

(52) U.S. Cl.
CPC ....... *H04N 5/23264* (2013.01); *H04N 5/23267* (2013.01); *G02F 2001/13756* (2013.01)

(58) Field of Classification Search
CPC .......... H04N 5/23248; H04N 5/23267; H04N 5/23264
USPC .................................................. 348/335, 345
See application file for complete search history.

(56) References Cited

U.S. PATENT DOCUMENTS

| 4,818,045 A | * | 4/1989 | Chang ............................. 359/15 |
| 4,835,090 A | * | 5/1989 | Sawyer ......................... 430/367 |
| 4,936,642 A | * | 6/1990 | Hung et al. ..................... 359/28 |

(Continued)

FOREIGN PATENT DOCUMENTS

| CN | 101331442 A | 12/2008 |
| JP | 3023422 A | 1/1991 |

(Continued)

OTHER PUBLICATIONS

Changyin Zhou et al: "Depth From Diffusion", 2010 IEEE Conf on Computer Vision and Pattern Recognition, Jun. 13, 2010, Sna Francisco, CA, USA, IEEE, pp. 1110-1117, XP031725919.

(Continued)

*Primary Examiner* — Antoinette Spinks

(57) ABSTRACT

A system and camera wherein the camera comprises in the light path a diffuser (4). The system or camera comprises a means (6) to modulate the diffusing properties of the diffuser (4) on an image projected by the lens on the sensor during exposure of the image. To the captured blurred image (10) an inverse point spread function is applied to deconvolute (24) the blurred image to a sharper image. Motion invariant image can so be achieved.

14 Claims, 12 Drawing Sheets

(51) Int. Cl.
*H04N 5/232* (2006.01)
*G02F 1/137* (2006.01)

(56) References Cited

U.S. PATENT DOCUMENTS

| | | | | |
|---|---|---|---|---|
| 5,124,815 | A | * | 6/1992 | Chang ............................. 359/10 |
| 5,903,788 | A | * | 5/1999 | Mukai et al. .................. 396/373 |
| 6,930,676 | B2 | | 8/2005 | De Haan et al. |
| 8,605,202 | B2 | | 12/2013 | Muijs et al. |
| 2004/0201771 | A1 | * | 10/2004 | Itoh .............................. 348/363 |
| 2006/0077279 | A1 | * | 4/2006 | Kang ................. G02B 13/0075 348/335 |
| 2007/0052953 | A1 | * | 3/2007 | Hill ............................ 356/237.2 |
| 2007/0242140 | A1 | * | 10/2007 | Kimura .................... 348/231.99 |
| 2009/0160764 | A1 | | 6/2009 | Myllymaeki |
| 2012/0062787 | A1 | | 3/2012 | Muijs et al. |

FOREIGN PATENT DOCUMENTS

| | | |
|---|---|---|
| JP | 6202200 A | 7/1994 |
| JP | 2004317650 A | 11/2004 |
| JP | 2008211679 A | 9/2008 |
| WO | 2007069125 A2 | 6/2007 |
| WO | 2010131142 A1 | 11/2010 |

OTHER PUBLICATIONS

O. Cossairt; "Diffusion-Coded Photography for Extended Depth of Field", ACM Transactions on Graphics: TOG, ACM, US, vol. 29, No. 4, Jul. 1, 2010, pp. 31:1-31:10, XP008140434.

H. Nagaharas et al; "Flexible Depth of Field Photography", European Conf on Computer Vision, Oct. 2008, XP002655864.

H.A.W. Schmeitz et al; "Sweeping Focus Camera",2008-044 Computational Imaging IP Generation, PR-TN2009/00745, pp. 1-64, Dec. 2009.

* cited by examiner

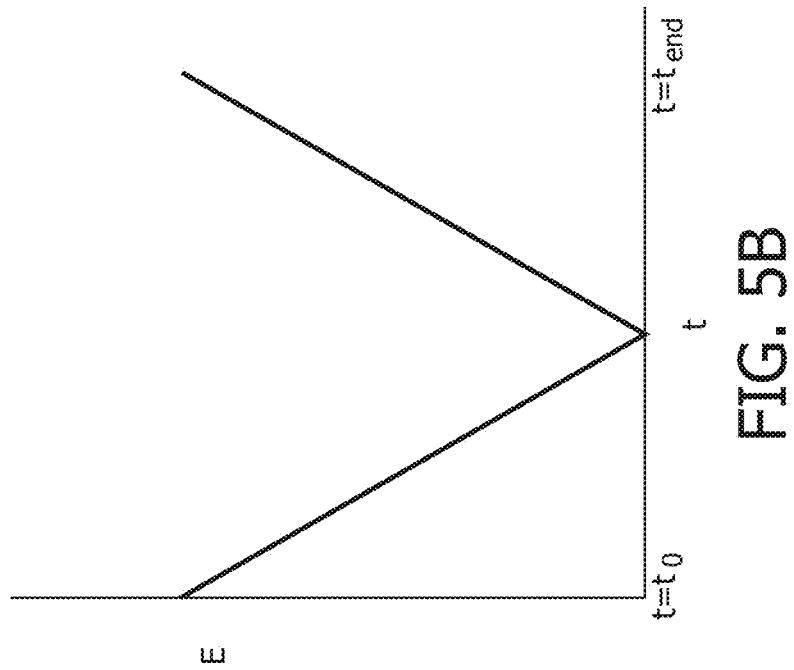
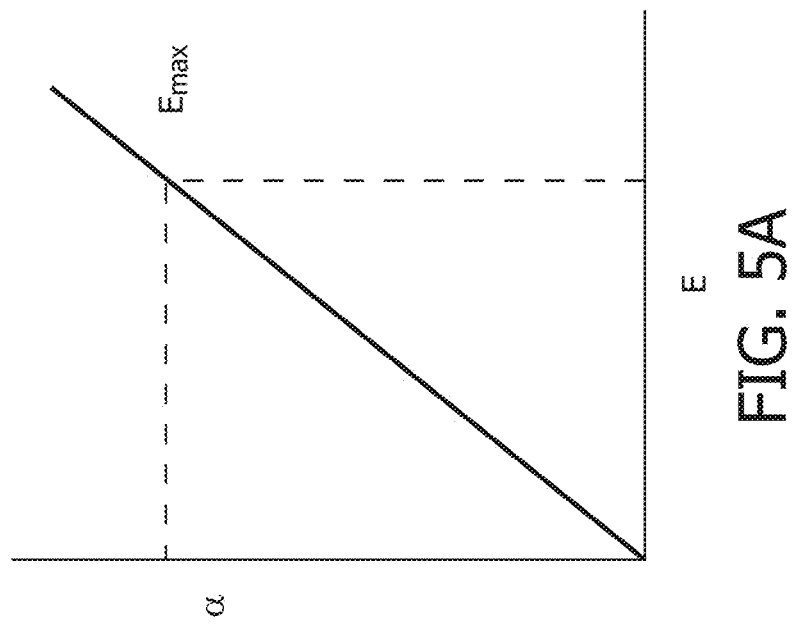
FIG. 5A
FIG. 5B

CAMERA SYSTEM COMPRISING A CAMERA, CAMERA, METHOD OF OPERATING A CAMERA AND METHOD FOR DECONVOLUTING A RECORDED IMAGE

FIELD OF THE INVENTION

The invention relates to a camera system comprising a camera with a lens and an image sensor.

The invention also relates to a camera with a lens and an image sensor.

The invention also relates to a method of operating a camera comprising a lens and an image sensor.

The invention also relates to a method for deconvoluting image data recorded by a camera comprising a lens and an image sensor.

BACKGROUND OF THE INVENTION

Conventional image sensors, such as CMOS and CCD sensors, integrate all light that impinges on them during the exposure time. This provides sharp images of static objects, but results in spatial blur for objects that move while the shutter is open. Objects that are not in focus, i.e. not positioned in the focal plane are also blurred. The so-called motion blur is proportional to the exposure time and object velocity. Motion blur is particularly troublesome when a camera operates under low light level conditions. Under such circumstances, long exposure times are desired to attain sufficiently high signal-to-noise levels such that the dark areas of a scene can be imaged adequately. Consequently, many cameras suffer from a classic trade-off between motion blur and dynamic range. The exposure times need to be long to capture enough light, but need to be small so as to reduce motion blur. Within the framework of the invention the word camera comprises cameras for taking photographs as well as cameras for video purposes.

A camera and method to reduce blur of objects that are not positioned in the focal plane are known from an article by Nagahara et al "Flexible Depth of Field Photography", H. Nagahara, S. Kuthirummal, C. Zhou, and S. K. Nayar, European Conference on Computer Vision (ECCV), October, 2008.

In Nagahara et al a camera for taking photographs is shown in which the distance between the sensor and a fixed focus lens is varied. The sensor is swept over a distance during the exposure time. The sweeping distance is arranged to sweep a range of scene depth ranges in order to increase the depth of field. The prior art camera disclosed in Nagahara et al reduces out-of-focus blur. To reduce the out-of-focus blur the sensor is swept along the optical axis to cover certain depth ranges. This concept is also called the 'sweeping focus camera'.

The sweeping of the focus provides for a compound image, in effect being a combination of a number of images at various focal depths. A point spread function (PSF) characterizing the blur caused by the sweep through various focal positions can be calculated. A point spread function is, in effect, the image a point of an object would make on the sensor. For an object completely in focus the point spread would be zero, and thus the PSF would be a Dirac function. The Fourier transform of this function would be a constant for all frequencies. For a point not in focus the PSF is a spread-out function, for an object in motion while the camera is fixed, the PSF would be spread out over a distance due to the motion. From the PSF one can calculate an inverse point spread function (IPSF). Deconvoluting the compound image with the inverse point spread function allows a sharp image to be obtained and an increased depth of field is obtained. This is due to the fact that, when the sensor is swept, the PSF for static objects at various distances becomes to a considerable degree the same. Thus, deconvolution the original image with one and the same IPSF would allow a sharp image at all distances, or at least an increased range of distance and the an increased depth of field is obtained for static objects.

Although out-of-focus blur and the reduction thereof may be and is important, a major problem, as explained above, exists and remains for moving objects, namely the motion blur, especially for larger exposure times.

Motion blur can be inverted by means of video processing. This is achieved by motion estimation and inverse filtering along the motion trajectory. This is known for instance from U.S. Pat. No. 6,930,676. In practice, however, the results of such a procedure suffer from inaccurate motion vectors, particularly for occlusion areas. One has to know the motion trajectory and deduce motion vectors from them to be able to do the inverse filtering. In many stand-alone cameras used in professional applications, motion vectors may not be available at all. For example, the recordings of many cameras used for surveillance or activity monitoring merely provide input to computer-vision-based analysis procedures (e.g., automatic detection of suspicious objects, fall-detection for elderly, etc). In these scenarios, the quality of the raw input frames is a determining factor for the performance of the detection system. Sufficiently accurate motion vectors may not be available on-the-fly within the camera and post-processing of recorded video is not an option in real-time monitoring systems. For a camera that takes a single snapshot it is fundamentally impossible to accurately determine motion vectors. At occlusion areas estimation of motion is also extremely difficult and inaccurate, if at all possible. At low light conditions the problems increase, due to the lack of light. Another method of getting rid of motion blur is to have the camera follow the moving object. However, this also has a number of significant disadvantages. Although the moving object is not blurred, everything else is. Furthermore, one has to know the direction as well as the speed of the object to accomplish such facts. This methods is thus only possible in situation where a fairly accurate determination of the speed and direction of movement can be made, for instance with formula I races or a ski jump, where the direction of motion is fairly accurately known in advance as well as an relatively accurate estimate of the speed may be made in advance.

Second, most traditional cameras feature an adjustable shutter and aperture that windows the light coming through the lens in the temporal and spatial dimensions. These can typically be characterized as box filters (i.e. a constant sensitivity over a finite interval), corresponding to a sinc modulation in the corresponding temporal and spatial frequency domains. As a result, some high frequencies are fully suppressed during acquisition and cannot be recovered during inverse FIR filtering even when perfect motion information would be available. In practice, inverse filtering should be done with utmost care to prevent the amplification of noise and the introduction of artefacts.

In International Patent Application WO 2010/131142 a system is described in which a sweeping focus set-up is used to accomplish motion invariant imaging. This is achieved by sweeping the focus fast by moving the sensor or lens, of changing the focus of the lens.

Since a sweeping focus is used the acquired image is sharp throughout the focal sweep range, background and foreground are sharp. To the human eye such an all-in-focus image often looks unnatural.

In short, various known ways for reducing motion blur in an image have their shortcomings.

SUMMARY OF THE INVENTION

It is an object to the invention to reduce motion blur in an alternative way.

To this end the system and camera according to the invention is characterized in that the camera comprises in the light path a diffuser, the system or camera comprising a means to modulate the diffusing properties of the diffuser on an image projected by the lens on the sensor during exposure of the image.

The method of operating a camera according to the invention is characterized in that the camera comprises in the light path a diffuser, and during the image acquisition the diffusing properties of the diffuser are modulated.

A method for deconvoluting image data according to the invention is characterized in that the camera comprises in the light path a diffuser, and during the image acquisition the diffusing properties of the diffuser are modulated and an inverse point spread function is applied to the acquired image to deconvolute the acquired image.

Motion blur is caused by movement of object in a direction perpendicular to the optical axis, for instance in a horizontal or vertical direction. This motion provides for an apparent motion of the object on the sensor during the exposure, which smears out the image of the moving object in the recorded image which leads to motion blur. Modulating the diffuser seems only to be contraproductive by introducing additional blurring. However, the blurring of the image due to the modulation of the diffuser can be undone by deconvolution of the image by using the appropriate inverse point spread function (IPSF) for the blur kernel due to the dynamic diffuser, equivalent to the inverse of the point spread function for the blurring caused by the dynamic diffuser.

The inventors have realized that introduction of blurring of the image by a modulated diffuser placed in the light path can be in fact be used to effectively counteract motion blur. The blur kernel introduced by the dynamic diffuser becomes to a practical degree the same for a range of object velocities. The PSF is therefor to a practical degree the same for a range of object velocities. This allows for a motion invariant imaging by using an IPSF which provides a sharp image for a range of object velocities by introducing dynamic blurring of the image. The camera may have a fixed focus during the image acquiring.

It is remarked that the dynamic diffuser can be placed anywhere within the light path, in front of the lens, or between the lens and the sensor of the sensor. Placing the dynamic diffuser in front of the lens allows existing cameras to be converted into cameras according to the invention. Placing the dynamic diffuser in between the camera and the sensor has an advantage that the position of the dynamic diffuser can be accurately determined.

Dynamic diffusing can be achieved for instance by using an electrically modulated diffuser and a diffuser driver which is responsible for the changing of the diffusive properties according to a controlling signal from a system controller, wherein the system controller synchronizes the dynamic modulation of the diffuser with the camera shutter.

Alternatively a diffuser with static properties can be used and the position of the diffuser can be changed during the exposure time, by moving the diffuser from a position close to the sensor to a more remote position while the shutter is open. In this embodiment the properties for the diffuser as such are not modulated. However, by modulating the position of the diffuser during the exposure time the diffusing effect of the diffuser on the image is modulated and thereby the effect of the diffuser becomes dynamic.

Preferably, however, the modulated diffuser has a fixed position and the diffusing properties of the diffuser are modulated. Movement of parts of the camera may cause vibrations which may cause blurring that cannot be counteracted by deconvolution an and may also cause, in due time, friction or relaxation, all potentially having negative effects.

The invention also relates to a system for recording images comprising a camera, further comprising a deconvolutor for deconvolution of a recorded image, wherein the camera comprises in the light path a dynamic diffuser, the system or camera furthermore comprising a means to modulate the properties of the diffuser from transparent to diffusing during the image integration and wherein the recorded image is deconvoluted with an inverse point spread function.

BRIEF DESCRIPTION OF THE DRAWINGS

These and other objects and advantageous aspects will become apparent from exemplary embodiments that will be described using the following Figs.

FIGS. 5A and 5B illustrates graphically the relation between the diffusion effect and the voltage applied to the diffuser.

The figures are not drawn to scale. Generally, identical components are denoted by the same reference numerals in the figures.

DETAILED DESCRIPTION OF PREFERRED EMBODIMENTS

The invention is based on the insight that by changing the camera parameters during the exposure time, the characteristics of the recorded image can be modified. This is exploited to design a camera of which the motion blur is, within a practical speed range, almost independent of the motion of the objects and preferably one of which the frequency behaviour is such that the recorded signal is better suited for inverse filtering. This allows sharp images to be generated from longer exposure time recordings without the need for motion estimation. In other words, the camera in accordance with the invention can provide sharp images with high SNR even for very challenging optical imaging conditions: objects moving at various, unknown velocities under low illumination levels. To this end a dynamic diffuser is present in the light path and the diffusing properties of the diffuser are modified from transparent to diffusing during the exposure time preferably in synchronicity with the exposure. This can be done by placing a diffuser at a fixed position within the light path and change dynamically during the exposure the diffusing properties of the diffuser, or, by using a diffuser with fixed diffusing properties and moving the diffuser during the exposure. Of course any combination of the two, to increase the range of change in diffusion, may also be possible.

Figure 1:
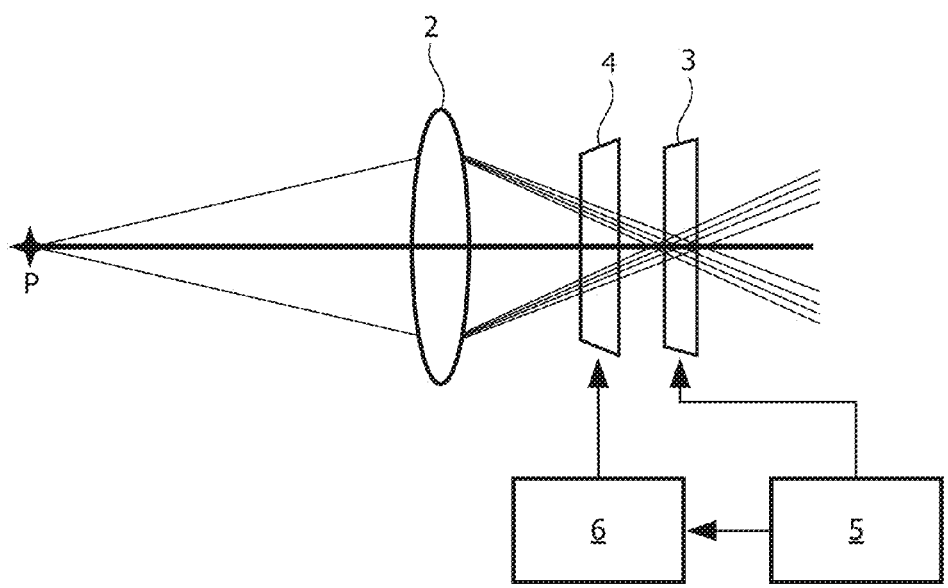
FIG. 1 illustrates the principal components of a camera system of the invention.

FIG. 1 illustrates various embodiments of the invention.

Object P is, through a lens 2, focussed. The focussed image is in FIG. 1 illustrated by the point where the light rays coming from the object cross. In FIG. 1 the camera has a dynamic diffuser 4 in the light path, which in this embodiment is situated between the lens 2 and the sensor 3. The diffusing action of diffuser 4 is, during the exposure time, dynamically adjusted. The concept of a traditional camera is thus modified in that its optical path a modulated diffuser 4 is positioned which is changing its diffusive properties (from transparent to diffusive) during the image integration. This concept is illustrated in FIG. 1. The system comprises the elements of a traditional camera system, and in addition a modulated diffuser, and in this example a diffuser driver 6 which is responsible for the changing of the diffusive properties according to a controlling signal, provided by a system controller 5 which synchronizes the action of the diffuser with the camera shutter.

The bundles of rays that exit the diffuser 4 schematically illustrate a diffuser in action, i.e. a diffuse bundle of light exiting the diffuser. In this figure a set-up is provided in which the dynamic diffusing properties of a diffuser, situated at a fixed position, vary. Alternatively one can use a diffuser with fixed properties and move the diffuser from a position near the sensor (at which position the diffuser has little effect) to and fro the sensor during exposure. The diffuser will lead to an image that is blurred due to the diffusing effect of the diffuser. Instead of a sharp point a blurred point is imaged on the sensor 3. The shape of the blurred point is also called the blur kernel. In FIG. 1 the object is assumed to be stationary.

The inventors have realized that introduction of blurring of the image by a modulated diffuser placed in the light path can be in fact be used to effectively counteract motion blur. The blur kernel introduced by the dynamic diffuser becomes to a high degree the same for a range of object velocities. The PSF of a point that is imaged on the sensor in a blur due to the diffusing action of the diffuser is to a high degree the same for a range of object velocities. This allows for a motion invariant imaging by using an IPSF which provides a sharp image for a range of object velocities by introducing dynamic blurring of the image.

Figure 2:
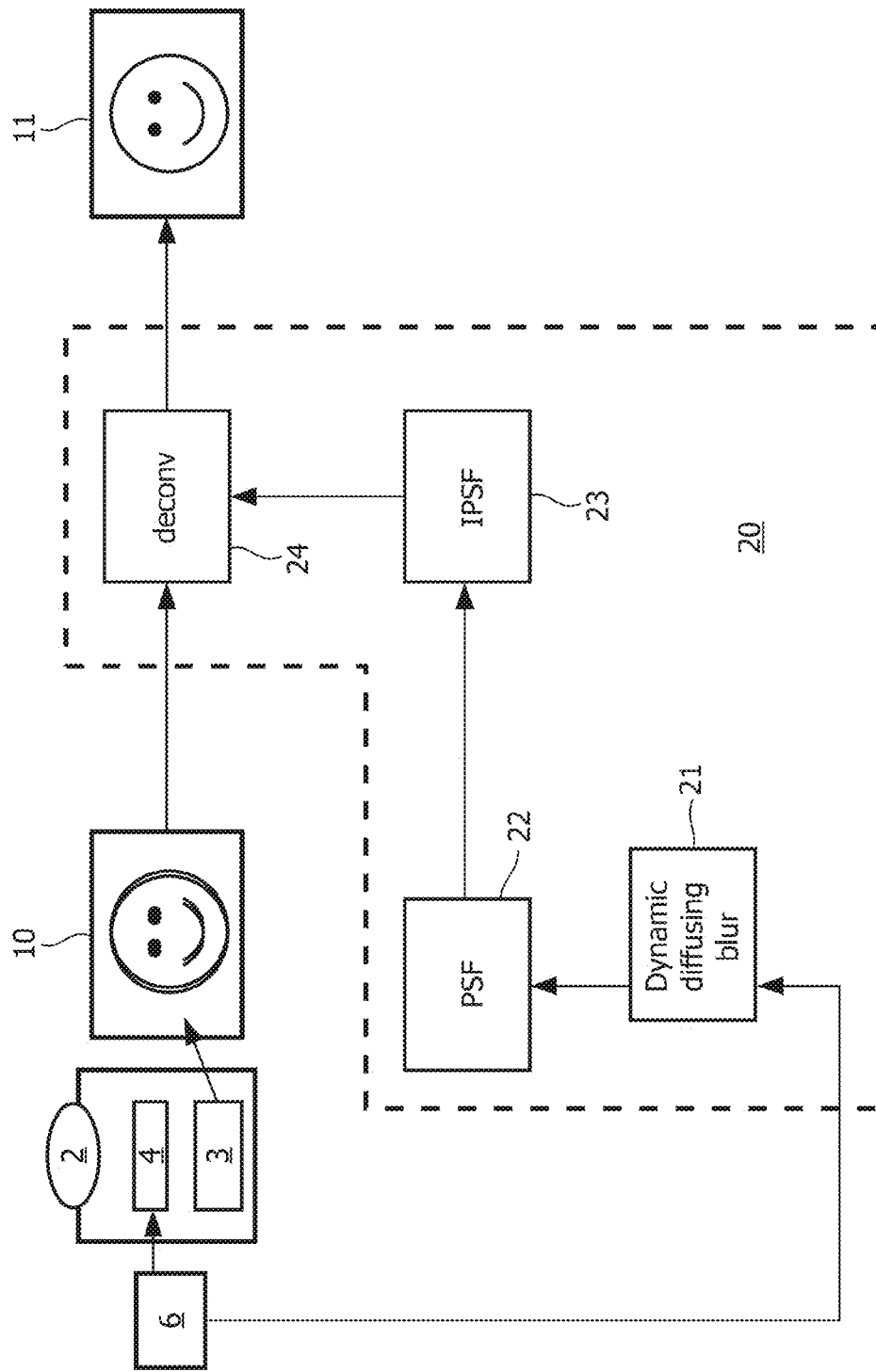
FIG. 2 illustrates an algorithm, system and method to filter a recorded image.

FIG. 2 illustrates how a recorded blurred image is deconvoluted to provide a sharp image. FIG. 2 illustrates a method for deconvoluting a recorded image and a system for recording image data and deconvoluting of recorded image data. The image is recorded by the camera, comprising a lens 2 and a sensor 3. In between the lens 2 and the sensor a diffuser 4 is positioned. A diffuser driver 6 regulates the diffusing function of the diffuser 4 during an exposure. The image data of the sensor 3 are read by a reader. The corresponding image 10 is schematically shown as a blurred image. The recorded blurred image 10 is deconvoluted in deconvolutor 20 to produce a sharpened image 11.

The system comprises a deconvolutor 20 to deconvolute the image data of blurred image 10. The method deconvolutes the recorded image data of image 11 by performing a deconvolution operation on the recorded image. For ease of understanding the algorithm for and method of deconvolution is shown in a number of steps. The first step 22 is to calculate or establish a point spread function PSF. In simple embodiments the PSF function for blurring due to the action of the diffuser is calculated for a static object independent of any other parameter. Since, as explained below, for a large range of speeds the PSF functions are nearly independent of the speed for embodiments of the invention, an IPSF for a static object will be a good first order approximation for an optimal PSF for a wide range of speeds. In more advanced embodiments the distance of the object or the speed of the object may used to fine-tune the PSF and thereby the IPSF. The distance of an object can for instance be recorded by the camera. Most cameras have some sort of autofocus that allows a determination of an object distance. As explained above it has been found that even if an object is not in focus in the middle of the sweep motion invariant imaging is very well possible. However, although using a single average PSF function for a static object will give good results, somewhat improved results may be obtained by fine-tuning the PSF by making the PSF dependent on the object distance and possibly further parameters, such as shutter time. This will provided for a somewhat asymmetric and sheared PSF. The end result will be a somewhat sharper image for a moving object at a particular distance from the lens, at the costs of somewhat less sharp image at other distances.

A standard PSF may be used, in which case it is not necessary to do any calculation to obtain the PSF, or, in embodiments wherein the PSF is fine tuned the settings of the diffuser driver 6 may also be an input for de deconvolutor 20. In FIG. 2 this is schematically indicated by block 21 which gets some data from diffuser driver 6 to fine tune the PSF. Although the invention allows a single PSF function for a wide range of object speeds to be used, some second order effects are still possible wherein the PSF can be fine-tuned for a particular speed. A possible field of application would be speed camera in such embodiments a good estimation of the direction and the speed of an object is known beforehand.

In step 22 the PSF for the particular blurring action is calculated or estimated or set (if, for instance, there are a number of possible choices). From the point spread function (step 21) the inverse point spread function IPSF is calculated. The blurred image 10 is deconvoluted with the IPS in step 24 to provide a sharpened image 11.

Figure 3:
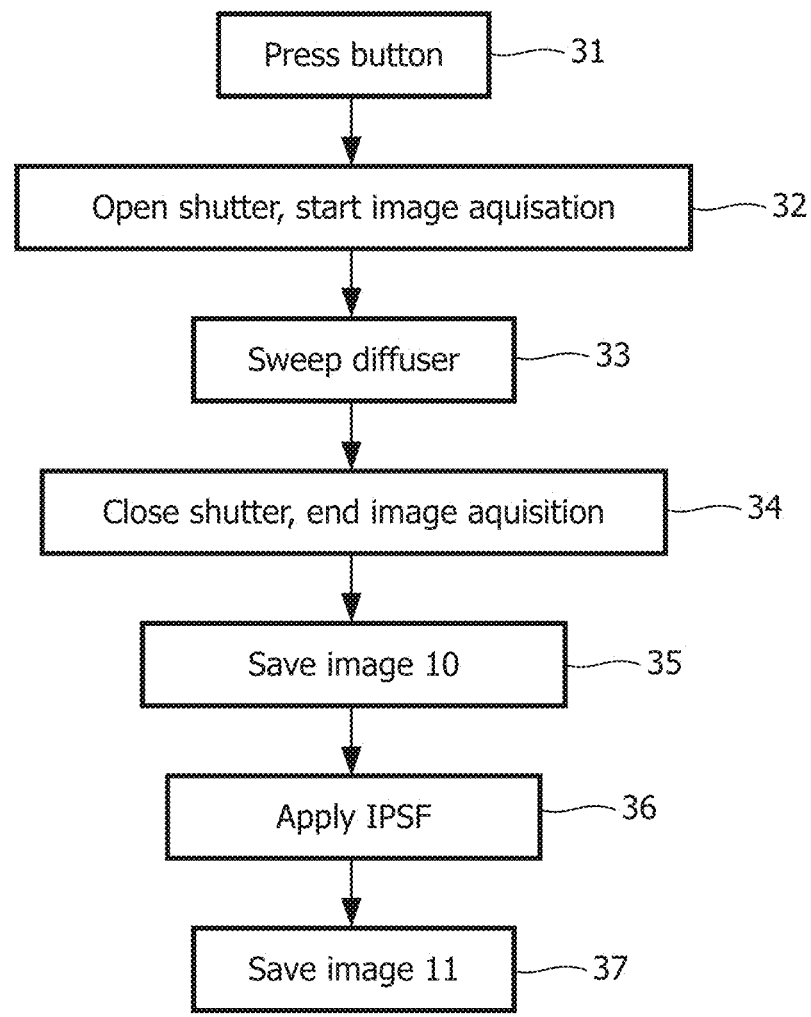
FIG. 3 illustrates various steps in the method of the invention.

FIG. 3 schematically illustrates the step of acquiring an image. In step 31 the start button is pressed. Of course, the phrase "press button" is merely a figure of speaking to denote the start of the image acquiring process. The image acquiring process may be started differently. For instance, for a speed camera or a surveillance camera, "press the button" may means that the recording process is initiated after some movement (or movement above a certain speed limit) is detected by means such as a laser gun or infrared movement sensors. In step 32 the shutter is opened and image acquisition is started. Of course, 'shutter' may be a physical shutter or an electronic shutter and is in FIG. 2 used to denote any process that allows light to go to the sensor, which amounts to opening the shutter, or shields the sensor from light, i.e. closing the shutter.

During image acquisition the diffuser is swept, i.e. the diffusing effect is changed from nearly transparent to more diffusing.

At step 34 the shutter is closed and the image acquisition is ended. The blurred image 10 is saved in step 35. To this image an IPSF (inverse Point Spread Function) is applied in a deconvolution step. This will lead to a sharpened image 11 which is saved.

Following figures explain the concepts of the invention.

For simplicity, image formation is considered as a 2D process (time and one spatial dimension, in the figures represented by x) in the following. However, the concepts discussed in this document extend to two lateral spatial dimensions (x, y).

To better understand the concept of motion-invariant imaging, it is useful to first outline spatio-temporal sampling characteristics of conventional cameras. In a conventional optical imaging system, such as a photo camera, the camera is focused at an object of interest, which amounts to fixing the displacement between the sensor and lens at an appropriate distance. Perfect static and motion sharpness can then be obtained when the spatio-temporal shutter operation is infinitesimally small in space and time (a Dirac δ(x,t), i.e. a singular point in space and time). In space time a static object remains at its position all the time and thus at a fixed position all of the time. The exposure is infinitesimally small in time and in space, so it is an infinitesimally small point in space and time. For this idealized hypothetical shutter configuration, the sensor records all frequencies at the same intensity, resulting in identical frequency characteristics for different motions. The Fourier transform such a signal is 1 for all values. For a Dirac function, all frequencies are sampled equally and the amplitude at all wavenumbers is equal. Given that all frequencies are sampled equally the amplitude at all wavenumbers at all possible speeds is equal, i.e. the PSF function is a constant. The PSF functions are thus also equal. Equal PSF functions means that at all speeds of an object the image is equally sharp and can be reconstructed by deconvoluting the image. Thus an ideal Dirac shutter would allow a sharp image at all speeds. However, a perfect Dirac shutter cannot be constructed and realistic approximations of it collect insufficient light to create a proper image. The image may be sharp for all speeds of an object in the image, but not enough light is captured to make the objects visible, which is highly impractical, to say the least. In practice, the shutter time (and aperture) is adjusted to the local light conditions and longer exposure times are required to collect sufficient light in dark environments to maintain an adequate signal-to-noise ratio. One way of solving the problems would be to develop sensors that are more sensitive to light, allowing the exposure time to become shorter and shorter approaching a Dirac function. However, in reality limits are posed on the sensitivity of the sensor and the shutter must be kept open for a period of time enough to collect light rays. Also the price of the camera usually increases sharply for faster sensors.

Most traditional cameras feature an adjustable shutter and aperture that windows the light coming through the lens in the temporal (i.e. during an exposure time) and spatial dimensions. These can typically be characterized as box filters (i.e. a constant sensitivity over a finite interval) in real time and space dimensions, corresponding to a sinc modulation in the corresponding temporal and spatial frequency domains. As a result, some high frequencies are fully suppressed during acquisition and cannot be recovered during inverse FIR filtering even when perfect motion information would be available. A realistic shutter has a finite extension, thus the box has a width in the x-direction. The shutter is open during a shutter time t.

In the temporal domain and the spatial frequency domain some high frequencies are suppressed. Some details are therefore lost and some artifacts are created. Furthermore, since for a realistic shutter the PSF functions are different for different speeds, one cannot use a single IPSF for deconvolution of the recorded image. In practice and in theory this means that it is impossible to deconvolute by some inverse filtering for a wide range of speeds. In short, motion invariant imaging is impossible.

For global motion, motion blur can be prevented by tracking the motion with the camera. Alternatively, this can be achieved by moving the sensor relative to the main lens at the desired speed along a lateral trajectory (perpendicular to the optical axis) during the exposure time. However, only objects moving at the target speed will be sharp in the recorded image, while all other scene areas remain blurred or become even more blurred than if nothing would have been done.

None of the prior art documents or techniques allow an effective motion blur reduction, unless the motion or the direction of the motion would be known in advance, or the camera is moved or motion vectors can be established, which is often not the case.

It is remarked that in International Patent Application WO 2010/131142 a system is described in which a sweeping focus set-up is used to accomplish motion invariant imaging. This is achieved by sweeping the focus fast by moving the sensor or lens, of changing the focus of the lens.

Since a sweeping focus is used the acquired image is sharp throughout the focal sweep range, background and foreground are sharp. To the human eye such an all-in-focus image often looks unnatural. Also the focusing characteristics of the camera have to be changed during acquisition.

The present invention takes a different path by introducing in the light path a dynamic diffuser.

Figure 4:
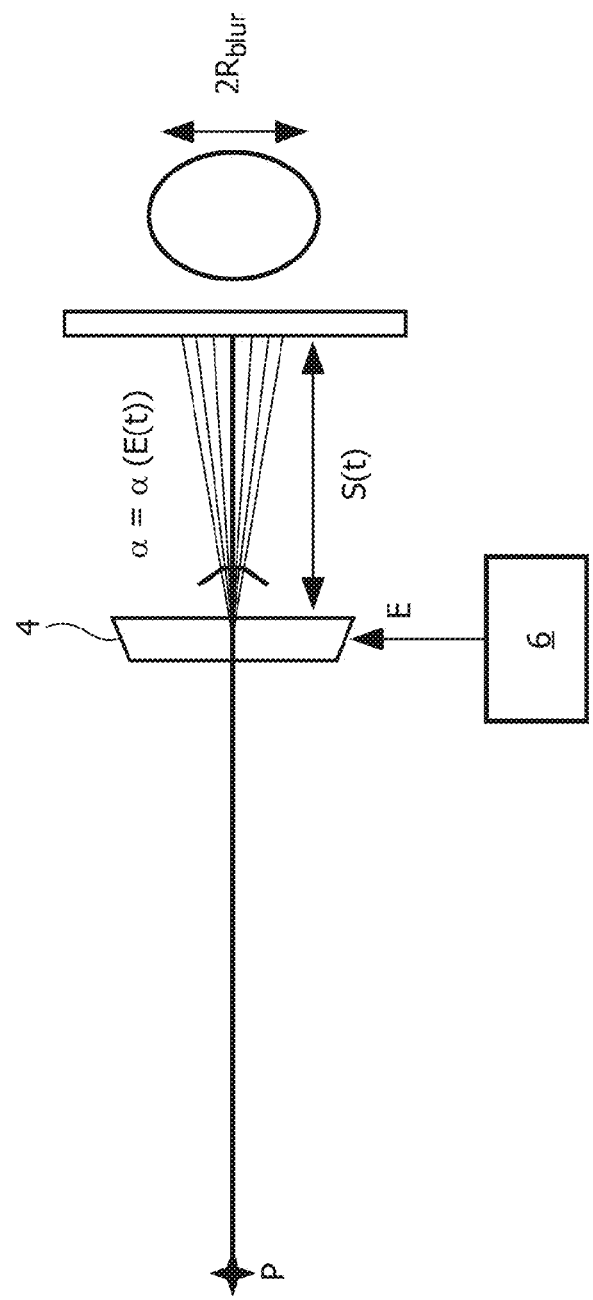
FIG. 4 illustrates the effect of a dynamical diffuser.

FIG. 4 illustrates the function of the diffuser 6.

The diffuser 4 distributes a light ray in a disk way (i.e. being projected on a screen it will give a bright disk of certain radius $R_{blur}$) such that the variance in the angles of the out-coming light rays depends on the applied driving signal E from the diffuser driver 6. FIG. 5A schematically show the angle of the light disk as a function of the driver signal E. The larger the driver signal E is, the larger the angle α and thus the larger the blur radius $R_{blur}$ of the light disk on the sensor. The driver signal goes from 0 to $E_{max}$ and thus the angle goes from 0, or more precisely a very small disk, to a disk corresponding with a maximum diffusing angle $\alpha(E_{max})$. The driver signal E(t) is synchronized with the exposure, so that during the exposure time the extent of the diffuse disk goes from large to nearly zero and then to large again.

The blur radius, which is the radius of the blurred spot on the sensor is a function of the distance s between the diffuser and the sensor, which distance may be time dependent, thus s=s(t), and of the angle α, in formula $$R_{blur,diffuser}(t)=s(t)x\sin(a(E(t))).$$

The blur radius thus changes as a function of time, if the distance s and/or the diver signal E changes. This change is called the blur speed which can be calculated by $$v_{blur,diffuser}=dR_{blur,diffuser}/dt=d(s(t)\times\sin(\alpha(E(t))))/dt$$

For a constant distance s and small values of α and a linear relation between α and E (thus dα/dE=constant), the above formula becomes
$V_{blur,diffuser}$=C*dE/dt, where C=s*constant and wherein C can be calculated or experimentally determined.

Figure 6:
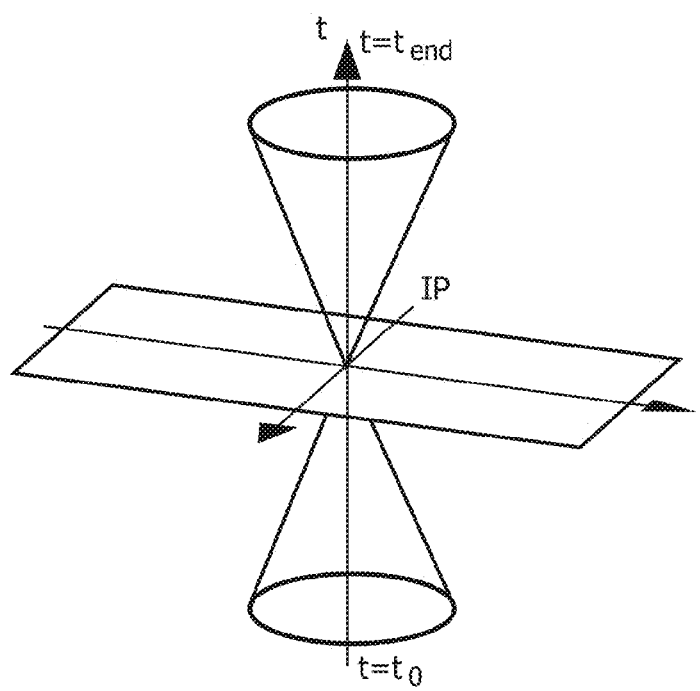
FIGS. 6, 7 and 8 illustrate respectively a space-time representation of the sensor integration area, the effective system blurring kernel, and the system blurring kernel on the logarithmic plot.

FIG. 6 illustrates, as a function of time t on the horizontal axis, the shape of the corresponding disk of light rays on the image plane IP, i.e. the disk that hits the sensor.

The disk goes from the start position t=$t_0$ (where E=$E_{max}$ and thus a large blur disk), to nearly a point (midway during the exposure) and then increases again to a large disk at t=$t_{end}$. The points of the two cones, which meet at the point of the image plane, are shown darker to illustrate that when the blur disk is small the intensity is high, since all light is concentrated on a small area.

Figure 7:
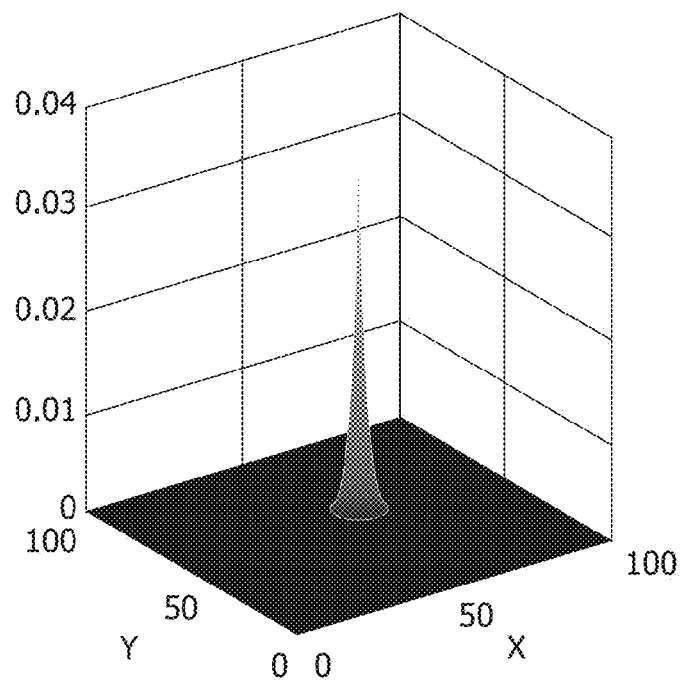
Figure 8:
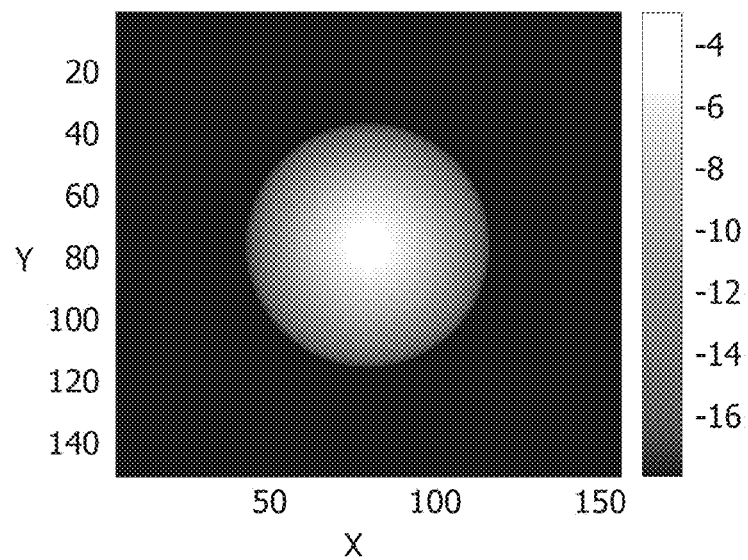

The total blur kernel for the exposure is given by the summation of all light impinging on the sensor during the exposure time. This will mainly be concentrated near the points where the cones cross the image plane. FIG. 7 the image captured by the sensor is a superposition of the differently blurred images corresponding to the different values of the distribution angle. The integral blurring effect can be modelled as a convolution with a integral blurring kernel, illustrated on FIGS. 6, 7 and 8 where FIG. 6 shows a space-time representation of the sensor integration area, FIG. 7 illustrates the effective system blurring kernel, and FIG. 8 illustrates system blurring kernel on the logarithmic plot. If one knows the blur kernel, the blurred imaged can be deconvoluted to provide a sharp image by a deconvoluting with the IPSF corresponding with the integrated blur kernel. If the used IPSf is close to the IPSF for the real situation, one will obtain a good result, i.e. a nearly sharp image. During image acquisition it is not necessary to change the focussing properties of the camera.

Figure 9:
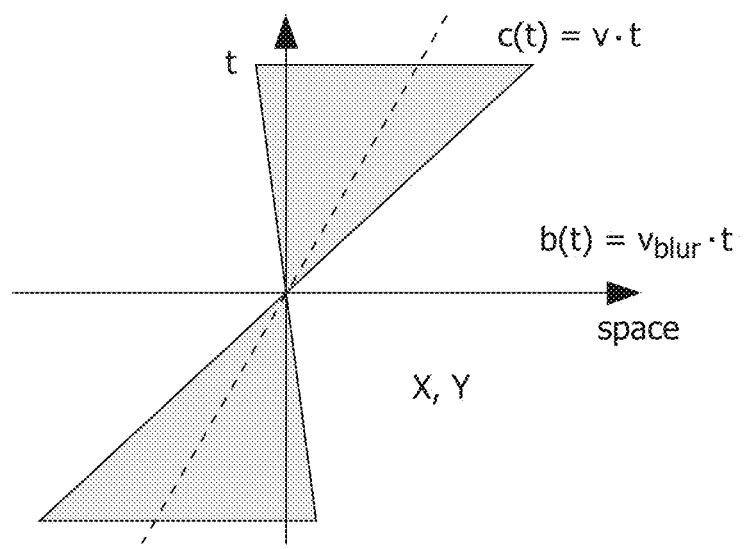
FIGS. 9 to 11 illustrate the system blurring kernel for a moving object
Figure 10:
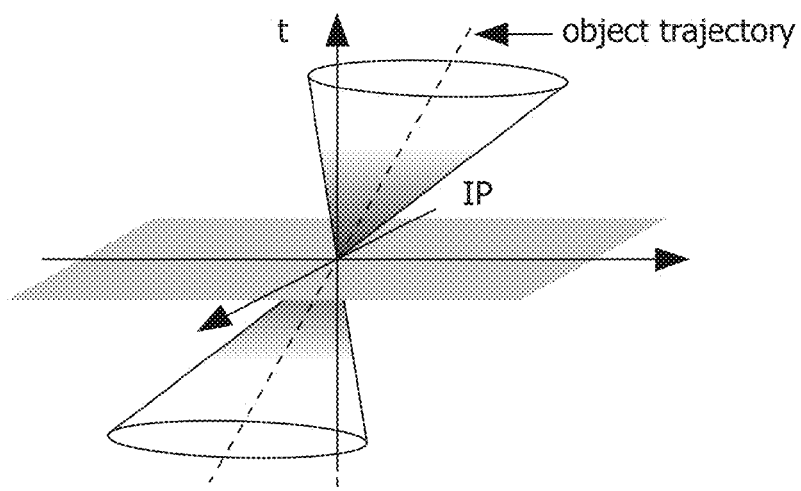
Figure 11:
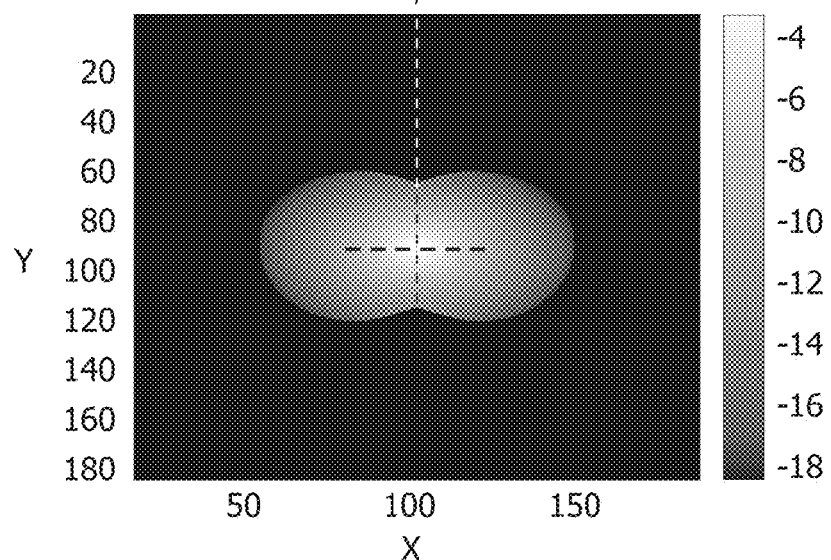

The blurring kernel shown in FIGS. 6 to 8 is that for a stationary object. When the object moves in the image plane during the exposure the blurring kernel changes. FIGS. 9, 10 and 11 show the result of a moving object. The cones are now situated on a sloped line. The slope of this line is related to the object speed, i.e. the speed with which the object moves in the image plane. This object speed on the sensor is a function of the speed of the object in the object plane and the ratio between the object distance and the distance between lens and sensor.

$$v_{object} = dx/dt * (\text{distance object to lens/distance lens sensor}).$$

Where dx/dt is the object speed in the image plane, if the object is moving in the image plane in the x-direction.

If the object is moving in the y direction dx/dt is replaced by dy/dt and if the object is moving in both directions the object speed is the square root of the squares of the speed in the x and the speed in the y-direction, as is well known.

The further an object is away from the lens, the lower the object speed on the sensor, the closer an object is to the lens, the higher the object speed on the sensor. The inventors have found that he system blur kernel is practically motion invariant if the object speed projected on the sensor is below 80 percent of the blur speed $V_{blur,diffuser}$. In practice this means that one can use the blur kernel for a stationary object as shown in FIG. 8, i.e. one that does not move, for the blur kernel for a moving object as shown in FIG. 11, without introducing in the deconvoluted image, appreciable motion blur. Since blur kernels of FIGS. 8 and 11 are nearly identical, the corresponding PSF functions are nearly identical, and deconvolution of recorded images using a single IPSF function is possible and allows a sharp image to be obtained for all objects at object speeds on the sensor below the blur speed, preferably below 80% of the blur speed. In FIG. 11 this is schematically indicated by the dotted line along the X-axis which dotted indicates the distance the centre of the image of the object travels over the sensor during the exposure. The distance is comparable to the extent of the blur kernel of FIG. 8.

Apart from motion blur there may be other sources of blur, so in practice a somewhat higher value of 100% of the blur speed is often acceptable.

Figure 12:
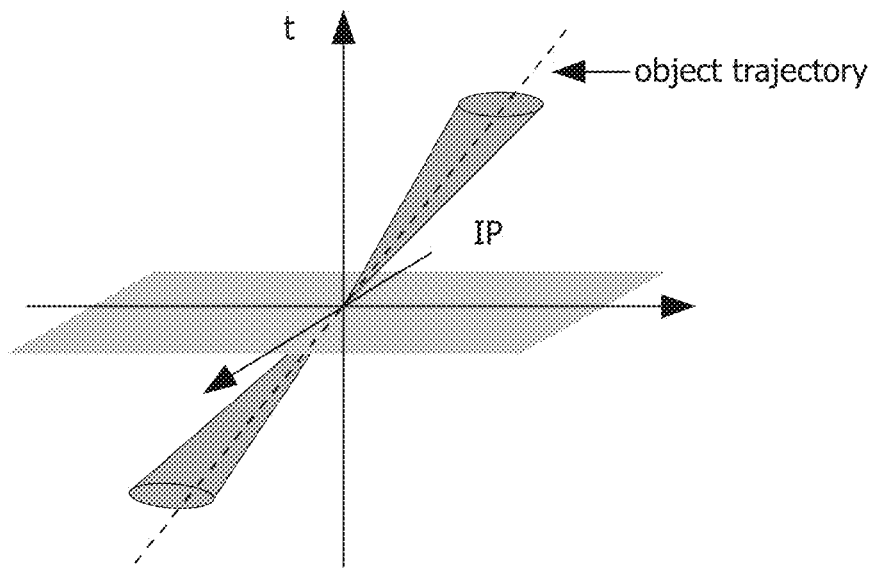
FIGS. 12 and 13 illustrate the system blurring kernel for a fast moving object, wherein the object speed exceeds the blur speed.
Figure 13:
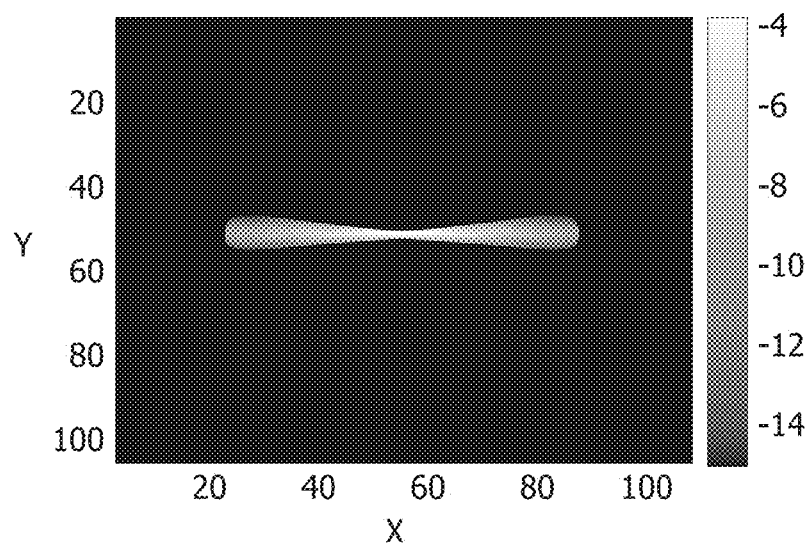

Around a situation where the object speed projected on the sensor is equal to the blur speed one can observe a gradual transition to the sinc-like kernel which is characteristic for a traditional camera. See e.g. FIGS. 12 and 13 which illustrate a situation in which the object speed on the sensor is much greater than the blur speed. The distance the centre of the spot of the image of an object exceeds the extent of the blur kernel of FIG. 8.

In such situations using the blur kernel for a stationary object to deconvolute a fast moving object will not lead to good results, since the corresponding IPSF functions differ greatly.

Typical speeds are 5 km/hour at an object-lens distance of 2 meter of 50 km/hour at an object-lens distance of 10 to 20 meter.

In preferred embodiments of the invention the diffuser driver 6 has an input which provides information on the object speed and or the object distance to the lens. An example is a speeding camera, which, depending on the street where it is used, may be triggered by a speed of 35 km/hour, or a speed of 130 km/hour and may have varying distances to the position at which the speed is to be measured. In such circumstances it may be useful to have different settings for the diffuser driver. Likewise a camera may have settings for different speeds.

It is remarked that within the framework of the invention "motion invariant imaging" is not to be so strictly interpreted as to mean that for any speed at any level of detail there would not be a difference in imaging; the object of the invention is to reduce motion variance, i.e. motion blur, within practical limits; a perfect solution is an ideal, not the reality.

The inventors have realized that the maximum object speed for which the PSF functions of an object captured on the sensor is basically the same as that for a static object, and thus motion invariant imaging is possible, if the blur speed is larger than the object speed, preferably more than 125% of the object speed on the sensor.

It should be noted that, although the above described methods and apparatuses can work blindly without having to know anything about the occurring object speeds in the scene and consequently on the sensor, if one has information regarding those increased reconstruction precision can be achieved (i.e. sharper/better final images). This can be done either statically (e.g. one knows which typical speeds occur, e.g. in a machine vision application where one knows the speed of the conveyer belt upon which objects to be analyzed come by, or one guesses what the best settings are and apply such setting), or dynamically, in which the system (e.g. iteratively) measures the speeds of the objects in the scene and/or the distance to the lens and adjusts the parameters of the diffuser driver optimally.

Thus, in such preferred embodiments, the system comprises means to set e.g. manually the parameters of the diffuser driver and/or means to establish the speed and/or the distance to the camera of an object to be recorded and wherein the means for adjusting the diffuser driver are arranged to obtain a signal from the means to establish the speed and/or distance of an object to be recorder.

In embodiments the diffuser is a dynamical diffuser to which a driver signal is sent to change the diffusing properties of the diffuser.

Figure 14A:
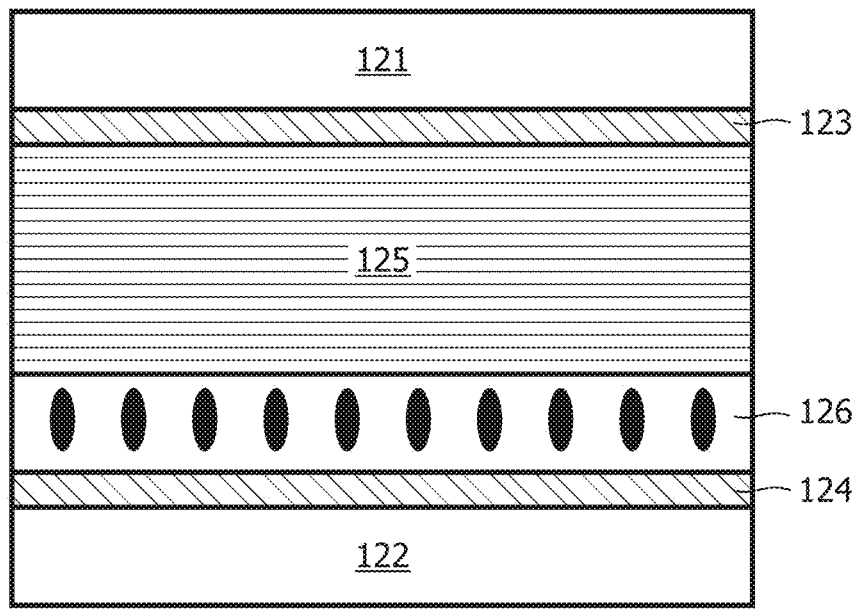
FIGS. 14A and 14B illustrate two embodiments of a dynamic diffuser
Figure 14B:
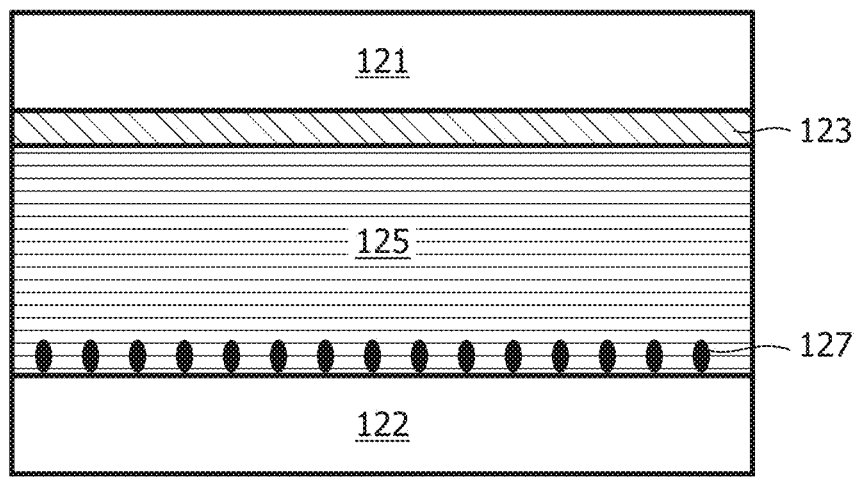
Figure 15A:
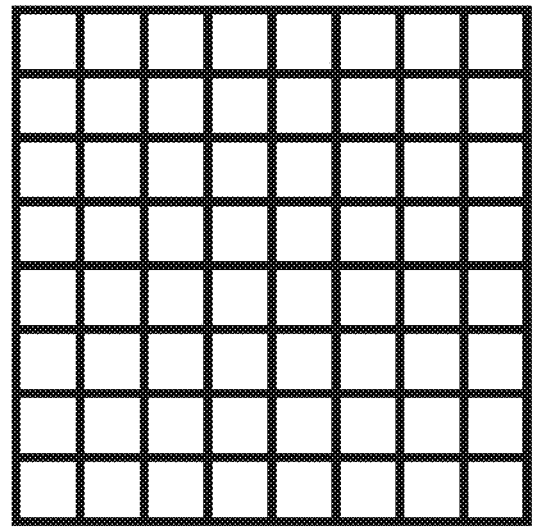
FIGS. 15A and 15B illustrate two embodiments of electrodes for a dynamic diffuser.
Figure 15B:
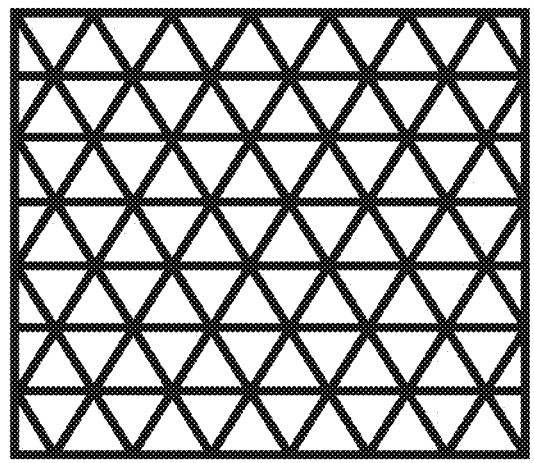

FIGS. 14A and 14B show embodiments which have the required properties. In both of them the diffuser comprises a layer of Liquid Crystals (LC) 125 enclosed between two transparent electrodes, e.g. made of transparent ITO, 123 and 124. This arrangement is positioned between two transparent glass or plastic substrates 121, 122. The LC are bi-refringent. Hence the local misalignment of LC molecules creates diffraction effect. At the absence of electric field the LC are aligned the same way, according to the surface of the electrodes. This makes the diffusers completely transparent. Between the electrodes a voltage may be applied. To that end the electrodes are connected to means for applying a voltage between the electrodes. When the voltage is applied, the electrodes 123, 124 create an electric field with the random/irregular local alignments. The LC rotates in the direction of the local electric field. Since LC are randomly/irregular aligned, the local refraction effects are perceived as a diffusive effect at macro-scale. Two embodiments shown on FIGS. 14A and 14B differ in the implementation of the non-uniform electric field. In FIG. 14A we propose to use two planar ITO electrodes and a planar electric field modulating layer 126 which has uniform refraction index and non-uniform dielectric transparency index. This layer can be made by combining two materials (e.g. encapsulating one into another) with identical refraction indices and different di-electric properties. If the voltage is applied to the planar electrodes the modulating layer is responsible for the creation of non-uniform electric field. The second embodiment is illustrated in FIG. 14B. In this embodiment at least one planar electrode 122, 124 is replaced by a grid electrode 127 which can e.g. be printed on the glass or plastic substrate. The grid size should be comparable with the thickness of LC material in order to create sufficient non-uniformity of the electric field. The grid should be sufficiently regular in order to provide uniform blurring effect on the macro-scale. Two examples of the planar grid electrodes are illustrated in the FIGS. 15A and 15B.

It will be clear that the exemplary embodiments of the invention are given by means of example and do not restrict the invention to the examples given.

For instance: Usually an image is taken in visible light. However, within the framework f of the invention the image may also be taken in infrared.

The deconvolutor 20 may form a part of the camera, or the deconvolutor is a part of a personal computer or is situated on a site on the internet to which one sends the images 10 for deconvolution. In the latter embodiment one could send image data comprising, for instance as meta-data, parameters to be used in the deconvolution step 23, i.e. the settings of the means 6. An example of such a set-up would be a grid of speed cameras which can be set for various speed limits, depending on the local speed limit and/or local circumstances, such as the amount of traffic, weather conditions, for instance fog, or activities such as road repair. Each speed camera may have its own setting depending on the type or make of camera, and which may be even adjustable to circumstances, i.e. the then and there applicable speed limit. The cameras send their image data to a central department, and sen with the image data the there and then applicable speed limit, and or the settings of means 6. At a regional or national or even transnational processing location (which may be an internet site) the image data with meta data are received, the sharp images are made, and these are added to the speeding tickets.

The invention may be used to take photograph or for video, for 2D images, or for taking 3D images. There can be used a single diffuser or two diffuser in series. The position of the diffuser may be in between the lens and the sensor, or anywhere else in the light path. The diffuser may be integrated in a lens system.

Since the kernel is in effect due to a sum of more or less diffused images, on can also use time multiplexing wherein the diffuser is during the exposure time multiplexed between a transparent and diffusing state, wherein the ratio between the two states is a function of time, in synchronicity with the exposure, ranging from highly diffuse at $t=t_0$, to completely transparent at the middle of the exposure, to highly diffuse at $t=t_{end}$. The dynamic behaviour of the diffuser may be initiated slightly before the shutter is opened and continue to slightly after closing of the shutter. This will remove any start-up irregularities.

In the examples the blur speed is taken to be constant. In embodiments the blur speed may be non-linear to emphasize more the middle part of the exposure, or either end of the exposure.

As explained, in embodiments it is possible to set the parameters of the blurring action. In embodiments the camera could allow various manual settings dependent on how fast it is assumed that the object moves, or how fast it is measured to be, wherein during exposure the position of the diffuser is static, but prior to the exposure the diffuser is moved to a certain position. As explained above the diffusing action is dependent on the distance s between the diffuser and the sensor, so, with one and the same relationship between the angle $\alpha$ and the signal E, one can expand the maximum extent of the blur radius during exposure (to extend the range of motion invariance, by moving the diffuser closer to or further away from the sensor. During the exposure, however, the diffuser does not move, so there is no movement during exposure, the only thing that is required is that the diffuser is moved prior to exposure.

In short the invention can be described by:

A system and camera wherein the camera comprises in the light path a diffuser (4). The system or camera comprises a means (6) to modulate the diffusing properties of the diffuser (4) on an image projected by the lens on the sensor during exposure of the image. To the captured blurred image (10) an inverse point spread function is applied to deconvolute (24) the blurred image to a sharper image. Motion invariant image can so be achieved.

The deconvolution can be performed inside the camera or camera system.

The invention claimed is:

1. A camera system comprising:
   a camera with a lens and an image sensor;
   a liquid crystal diffuser in a light path of the camera;
   a diffuser driver that electronically drives the liquid crystal diffuser to vary an amount of diffusion by the liquid crystal diffuser on light received by the camera system projected by the lens on the sensor during an individual exposure of an image on the sensor;
   a controller that synchronizes the diffuser driver and the amount of diffusion with the exposure to vary the amount of diffusion during the exposure; and
   a deconvolutor for deconvolution of a recorded image, wherein diffusion during the individual exposure produces a blur kernel, the blur kernel comprising a blurred point imaged on the sensor, the blurred point having a blur radius that changes over time during the individual exposure, and wherein the deconvoluter is configured to deconvolute the recorded image based on the blur kernel.

2. A camera system as claimed in claim 1, wherein the diffuser driver dynamically changes diffusing properties of the liquid crystal diffuser in synchronicity with the exposure.

3. A camera system as claimed in claim 1, wherein the diffuser driver is arranged to, during the individual exposure, drive the liquid crystal diffuser gradually from a diffusing state, to a lesser diffusing state, to a transparent state, to a lesser diffusing state, to a diffusing state.

4. A camera system as claimed in claim 3, wherein the controller is configured to cause the diffuser driver to electronically drive the liquid crystal diffuser.

5. A camera system as claimed in claim 4 wherein the controller is configured such that parameters of the diffuser driver are set manually.

6. A camera system as claimed in claim 4, wherein the diffuser driver is configured to establish the speed and/or the distance to the camera of an object to be recorded and wherein the controller is arranged to obtain a signal from the diffuser driver that communicates information related to the speed and/or the distance to the camera of the object.

7. A camera system as claimed in claim 1, wherein the recorded image is deconvoluted with an inverse point spread function (IPSF).

8. A camera system as claimed in claim 7 wherein the liquid crystal diffuser is positioned in front of the lens.

9. A camera system as claimed in claim 7 wherein the liquid crystal diffuser is positioned in between the lens and the sensor.

10. A camera for a camera system as claimed in claim 9.

11. A camera system as claimed in claim 1 wherein the system comprises means for moving the diffuser in synchronicity with the exposure.

12. A method of operating a camera, wherein the camera comprises a lens, an image sensor, and a liquid crystal diffuser in a light path of the camera, the method comprising:
   electronically driving the liquid crystal diffuser during an individual exposure for image acquisition to vary an amount of diffusion by the liquid crystal diffuser on light received by the camera system projected by the lens on the sensor; and
   synchronizing the amount of diffusion with the exposure to vary the amount of diffusion during the exposure,
   wherein diffusion during the individual exposure produces a blur kernel, the blur kernel comprising a blurred point imaged on the sensor, the blurred point having a blur radius that changes over time during the individual exposure, the method further comprising deconvoluting the recorded image based on the blur kernel.

13. A method as claimed in claim 12, wherein the amount of diffusion depends on signals conveying information corresponding to a speed and/or a distance to the lens of a recorded object.

14. A method for deconvoluting image data recorded by a camera comprising a lens and an image sensor, and comprising, in a light path of the camera, a liquid crystal diffuser, wherein during image acquisition the liquid crystal diffuser is electronically driven to vary an amount of diffusion by the liquid crystal diffuser on light received by the camera projected by the lens on the sensor during an individual exposure of an image on the image sensor, and an inverse point spread function (IPSF) is applied to the acquired image to deconvolute the acquired image, wherein diffusion during the individual exposure produces a blur kernel, the blur kernel comprising a blurred point imaged on the sensor, the blurred point having a blur radius that changes over time during the individual exposure, and wherein deconvoluting the recorded image with the IPSF is based on the blur kernel.

* * * * *